US006976208B1

(12) United States Patent
Kim et al.

(10) Patent No.: US 6,976,208 B1
(45) Date of Patent: Dec. 13, 2005

(54) PROGRESSIVE ADAPTIVE TIME STAMP RESOLUTION IN MULTIMEDIA AUTHORING

(75) Inventors: Michelle Y. Kim, Scarsdale, NY (US); Peter H. Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/200,985

(22) Filed: Nov. 30, 1998

Related U.S. Application Data

(60) Provisional application No. 60/106,764, filed on Nov. 3, 1998.

(51) Int. Cl.[7] .............................................. G06F 15/00
(52) U.S. Cl. ................. 715/500.1; 709/226; 370/395.1
(58) Field of Search .. 707/500.1, 507.1; 709/232–235, 709/225, 226; 345/475, 835, 839; 715/500.1, 715/501.1; 370/394, 395.1, 473

(56) References Cited

U.S. PATENT DOCUMENTS 4,538,259 A * 8/1985 Moore ........................ 370/394
5,388,264 A * 2/1995 Tobias II et al. ........... 707/103
5,515,490 A * 5/1996 Buchanan et al. .......... 395/807
5,533,021 A * 7/1996 Branstad et al. ............ 370/396
5,553,222 A * 9/1996 Milne et al. ................ 395/806
5,596,696 A * 1/1997 Tindell et al. .............. 395/806
5,659,790 A * 8/1997 Kim et al.
5,680,639 A * 10/1997 Milne et al. ................ 345/302
5,682,384 A * 10/1997 Zarros ........................ 370/394
5,742,283 A * 4/1998 Kim
5,933,835 A * 8/1999 Adams et al. ................ 707/10
6,064,379 A * 5/2000 DeMoney ................... 345/723
6,085,221 A * 7/2000 Graf ........................... 709/202
6,397,251 B1 * 5/2002 Graf ........................... 709/225

* cited by examiner

*Primary Examiner*—William Bashore
*Assistant Examiner*—Maikhanh Nguyen
(74) *Attorney, Agent, or Firm*—Greenblum & Bernstein P.L.C.; Douglas W. Cameron, Esq.

(57) ABSTRACT

Environments with unreliable delivery may result in faltering presentation of multimedia objects, due to missing time stamp deadlines. This may be alleviated by introducing more flexible time stamping. To avoid this, additional MPEG-4 object time information is sent to the client. This requires a new dedicated descriptor, carried in the Elementary Stream Descriptor. The new more flexible timing information will have two features. First, instead of fixed start and end times, the duration of an object can be given a range. And second, the start and end times are made relative to other multimedia object start and end times. This information can then be used by the client to adapt the timing of the ongoing presentation to the environment, while having more room to stay within the presentation author's intent and expectations.

2 Claims, 5 Drawing Sheets

PROGRESSIVE ADAPTIVE TIME STAMP RESOLUTION IN MULTIMEDIA AUTHORING

CROSS-REFERENCE TO RELATED APPLICATION

This application is continuation-in-part of provisional patent application Ser. No. 60/106,764 filed Nov. 3, 1998, the benefit of the filing date of which is hereby claimed for the commonly disclosed subject matter.

BACKGROUND OF THE INVENTION

1. Field of the Invention

The present invention generally relates to composing and playing multimedia presentations and, more particularly, to a flexible time stamp information carried in the stream descriptor of the multimedia presentation.

2. Background Description

Multimedia authoring systems exist that allow the user (i.e., the author) to insert multimedia objects, such as video, audio, still pictures, and graphics, into a multimedia presentation at a certain spatial position and with a certain temporal location. Such an authoring system is used typically to create presentations that are in an MPEG-4 (Motion Picture Experts Group, version 4) or SMIL (Synchronized Multimedia Integration Language) format.

In more advanced authoring systems, the temporal location of the multimedia objects need not be absolute in time, but can be defined relative to other multimedia objects. This means that, for example, a video clip can be authored to start at the same time that a specific audio clip starts. Another such example is that after completely playing a certain video clip, another video clip should be played, possibly with some delay. The essence of this is that multimedia objects have start and end times that are defined with respect to the start and end times of other multimedia objects, with possible temporal offsets (delays).

A further feature of advanced temporal authoring of multimedia objects is the possibility to have a range in duration of multimedia objects. For example, a certain video clip has a certain duration when played at the speed at which it was captured, say thirty frames per second. This now allows authors to define a range in the playback speed, for example between fifteen frames per second (slow motion by a factor of two) and sixty frames per second (fast play by a factor of two). This results in respectively a maximum and minimum total playback duration. In general, the advanced authoring systems allow authors to specify such ranges in multimedia object playback duration. Note, that it is still possible to dictate only one specific playback duration (which is directly related to the playback speed in the case of video, audio, or animation) by restricting the duration range to a zero width.

If we now combine the relative start and end times of multimedia objects in the authoring system with the possibility to also specify a duration range, we see that a complete authored multimedia presentation is a complex but flexible system of interconnected objects with variable durations. The advantage of having this flexibility in duration lies in the data transmission and playback of multimedia objects. By not having very strict multimedia start and end times, the system has some flexibility to adapt to data delivery problems, which may be due to network congestion or transmission errors. For the final delivery and playback the system (which may be the server or the client) will resolve the true multimedia object start and end times during transmission and playback adaptive to the environment.

In general, with these variable object durations, many actual values for start and end time are possible for all of the multimedia objects, especially when no delivery problems occur. In actual playback, absolute time stamps must be used. That means that for every multimedia object a playback duration is chosen which lies within the range of its possible durations. The problem of determining these factual durations at run time (i.e., playback) is addressed here. The method will be progressive in time; that is, it resolves the absolute time stamps as time advances, making it adaptive to the changing environment. Finally, it must be defined what information is to be sent to a client, that is sufficient to do the time stamp resolution.

SUMMARY OF THE INVENTION

It is therefore an object of the present invention to provide a technique for determining the factual durations of multimedia objects at run time.

It is another object of the invention to provide a new dedicated descriptor of object time duration to alleviate the problem of unreliable delivery of objects in a multimedia presentation.

According to the invention, the solution to the problem consists of two parts. First, it is necessary to define what information must be available to the client in order to be able to determine the multimedia object durations. And second, the resolution of the durations themselves must be solved. The new flexible timing information can be used by the client to adapt the timing of the ongoing presentation to the environment, while having more room to stay within the presentation author's intent and expectations.

Six steps are used to resolve the actual label time, and the corresponding duration of the multimedia objects that have that label for their respective end times. In the first step, all the dependency relations are collected for the label Px, by taking all objects n that have Px as the label for their end time:

$$t_n+\text{minimum}(n)\leqq t_x\leqq t_n+\text{maximum}(n)\quad n=1, \ldots, N$$

Here $t_n$ is the start time of object n, and N is the number of objects.

In the second step, the N relations are used to calculate the tightest bounds on $t_x$:

$$\min\{t_x\}\leqq t_x\leqq \max\{t_x\}$$

with $$\min\{t_x\}=\max\{t_n+\text{minimum}(n)\}\quad n=1, \ldots, N$$

$$\max\{t_x\}=\min\{t_n+\text{maximum}(n)\}\quad n=1, \ldots, N$$

In the third step, the bounds on the durations of each object n are recalculated by using:

$$\text{duration}(n)=t_x-t_n$$

to get $$\min\{t_x\}-t_n\leqq \text{duration}(n)\leqq \max\{t_x\}-t_n\quad n=1, \ldots, N$$

In the fourth step, the preferred duration of each object n is recalculated:

if (preferred($n$)<$\min\{t_x\}-t_n$) then preferred($n$)=$\min\{t_x\}-t_n$ else if (preferred($n$)>$\max\{t_x\}-t_n$) then preferred($n$)=$\max\{t_x\}-t_n$ end if In the sixth step, the general error criterion for resolving the duration of each multimedia object is defined as:

$$E=\sum_{n=1}^{N}\{\text{duration}(n)-\text{preferred}(n)\}^2$$

or, substituting duration(n)=$t_x-t_n$:

$$E=\sum_{n=1}^{N}\{t_x-t_n-\text{preferred}(n)\}^2$$

If we take the derivative of E with respect to $t_x$, and set this to 0, we see that the optimal solution for the absolute time $t_x$ of label Px is:

$$t_x=\frac{1}{N}\sum_{n=1}^{N}\{t_n+\text{preferred}(n)\}$$

Finally, in the sixth step, the corresponding duration of multimedia object n is calculated with:

$$\text{duration}(n)=t_x-t_n$$

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
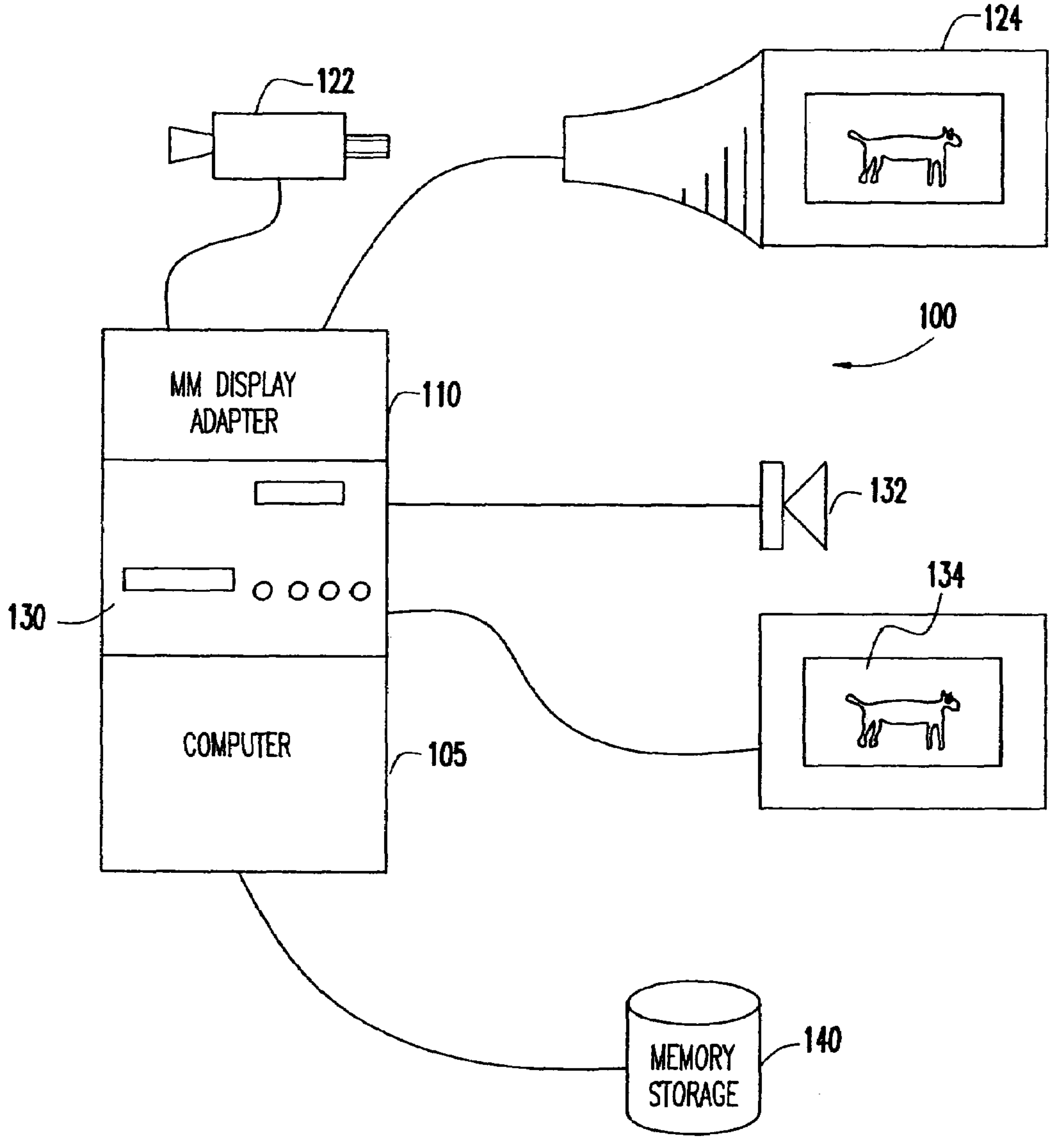
FIG. 1 is a block diagram of one preferred computer system with multimedia inputs and outputs that uses the method of the present invention.

Referring now to the drawings, and more particularly to FIG. 1, there is shown in block diagram form a computer system 100 on which the subject invention may be practiced. The computer system 100 includes a personal computer (PC) 105 running a windowing operating system and including a multimedia audio/video capture adaptor 110. A video camera 122 connects to the adaptor 110 as does an optional playback monitor 124 for multimedia presentations composed on the computer system 100. Other multimedia hardware 130 may be included as well as various input devices, such a keyboard (not shown), a cursor pointing device (e.g., a mouse) (not shown) and a microphone 132 or other audio input device, and a monitor 134 on which a graphic user interface (GUI) of the operating system and application software is displayed. The computer 105 includes secondary memory storage (e.g., a hard drive) 140 of adequate capacity to store the multimedia presentation being authored.

The solution to the problem outlined above is best illustrated by a simple example. Let us consider a presentation that is authored having three multimedia objects, a video clip (V), an audio clip (A), and a background image (B). As explained above, the Isis authoring system requires the author to specify for each multimedia object the duration range, as well as a relative start and end time. For the three objects in our exemplary presentation, the parameters are authored as:

| | start | end | minimum duration | preferred duration | maximum duration |
|---|---|---|---|---|---|
| V | P1 | P2 | 3 seconds | 4 seconds | 5 seconds |
| A | P2 | P3 | 3 seconds | 4 seconds | 4 seconds |
| B | P1 | P3 | 7 seconds | 7 seconds | 8 seconds |

The labels P1, P2, and P3 are to indicate how the various multimedia objects are temporarily related. This means, for example, that objects V and B start at the same time. The temporal aspect of this authored presentation can be depicted more clearly in FIG. 2.

Figure 2:
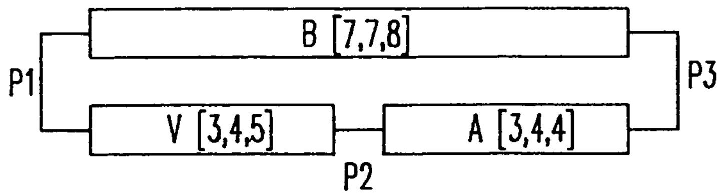
FIG. 2 is a temporal diagram illustrating the problem solved by the present invention.

As shown in FIG. 2, the background image B starts a point P1 and ends at a point P3. The duration times are shown in brackets as 7,7,8 corresponding to 7 seconds minimum duration, 7 seconds preferred duration, and 8 seconds maximum duration. Similarly, the video clip V begins at the point P1 and ends at a point P2, and the audio clip A begins at the point P2 and ends at the point P3, again with duration times shown in the brackets.

The player (the client) of the multimedia presentation first receives the multimedia object parameters for video clip V and background B. The player then initializes the time of point P1 (arbitrarily) to $t_1=0$, and starts playing the two objects V and B with their preferred duration. For the video clip V, this means it will be played at the corresponding preferred speed. If no network or playback delays occurred, the video will finish after four seconds. However, if a delay of 12 second occurred during playback, the time of point P2 is not $t_2=4$, but $t_2=4.5$. The player next attempts to resolve the durations of B and A. It does this using the relations:

$$t_1+7\leqq t_3\leqq t_1+8$$

$$t_2+3\leqq t_3\leqq t_2+4$$

Knowing that $t_1=0$ and $t_2=4.5$, we obtain:

$$7\leqq t_3\leqq 8$$

$$7.5\leqq t_3\leqq 8.5$$

Which is combined into:

$$7.5 \leqq t_3 \leqq 8$$

With this we can recalculate the duration range for both the background B and audio clip A. Using:

$$\text{duration}(B)=t_3-t_1=t_3$$

$$\text{duration}(A)=t_3-t_2=t_3-4.5$$

we get $$7.5 \leqq \text{duration}(B) \leqq 8.0$$

$$3.0 \leqq \text{duration}(A) \leqq 3.5$$

We next use these new duration ranges to redefine the preferred durations of both audio clip A and background B. For background B, we see that the preferred duration cannot be met, and we have to settle for the closest value to the preferred value, which is now 7.5 seconds. Similarly, the preferred duration for the object audio clip A changes to 3.5 seconds:

$$\text{preferred}(B)=7.5$$

$$\text{preferred}(A)=3.5$$

Finally, we can use these now feasible preferred durations to determine a good value for the time $t_3$ at point P3, and thus for the durations of the objects B and A. We do this by defining an error criterion on the durations as the sum of the squared deviations from the (updated) preferred durations:

$$E=\{\text{duration}(B)-\text{preferred}(B)\}^2+\{\text{duration}(A)-\text{preferred}(A)\}^2$$

Using the definitions of the durations from above, and the recalculated preferred durations, this is rewritten into:

$$E=\{t_3-7.5\}^2+\{t_3-4.5-3.5\}^2=\{t_3-7.5\}^2+\{t_3-8.0\}^2$$

Minimizing this error with respect to $t_3$ simply yields:

$$t_3=\tfrac{1}{2}(7.5+8.0)=7.75$$

and the durations are $$\text{duration}(B)=7.75$$

$$\text{duration}(A)=3.25$$

From this example, it will be understood that the solution to the problem consists of two parts. First, it is defined what information must be available to the client in order to be able to determine the multimedia object durations. And second, the resolution of the durations themselves must be solved.

A client (i.e., player of the multimedia presentation) must receive for each multimedia object five items of information. These items are the two labels, one for the object's start time and one for the end time, and the three durations, the minimum, maximum, and the preferred duration. In the case of video, audio, and other multimedia objects that have a playback speed, the preferred duration must correspond to the "regular" playback speed of the object. The information on a particular multimedia object must be delivered to the client prior to starting playback of the object.

When playback has finished for a particular multimedia object, the absolute time of a certain label will become known. This means, that one or more label times can be resolved using this new information. The time stamp resolution is therefore progressive over time, as more information becomes available in the form of factual multimedia object durations, and arrival of information of objects that are to be played in the (near) future.

To resolve the actual label time, and the corresponding duration of the multimedia objects that have that label for their respective end times, the following steps are taken:

1. Collect all the dependency relations for the label Px, by taking all objects n that have Px as the label for their end time:

$$t_n+\text{minimum}(n) \leqq t_x \leqq t_n+\text{maximum}(n) \quad n=1, \ldots, N$$

Here $t_n$ is the start time of object n, and N is the number of objects.

2. Use the N relations to calculate the tightest bounds on $t_x$:

$$\min\{t_x\} \leqq t_x \leqq \max\{t_x\}$$

with $$\min\{t_x\}=\max\{t_n+\text{minimum}(n)\} \quad n=1, \ldots N$$

$$\max\{t_x\}=\min\{t_n+\text{maximum}(n)\} \quad n=1, \ldots N$$

3. Recalculate the bounds on the durations of each object n, by using:

$$\text{duration}(n)=t_x-t_n$$

to get $$\min\{t_x\}-t_n \leqq \text{duration}(n) \leqq \max\{t_x-\}t_n \quad n=1, \ldots, N$$

4. Recalculate the preferred duration of each object n:

if (preferred($n$)<min{$t_x$}−$t_n$) then preferred($n$)=min{$t_x$}−$t_n$ else if (preferred($n$)>max{$t_x$}−$t_n$) then preferred($n$)=max{$t_x$}−$t_n$ end if 5. The general error criterion for resolving the duration of each multimedia object is defined as:

$$E=\sum_{n=1}^{N}\{\text{duration}(n)-\text{preferred}(n)\}^2$$

or, substituting duration(n)=$t_x-t_n$:

$$E=\sum_{n=1}^{N}\{t_x-t_n-\text{preferred}(n)\}^2$$

If we take the derivative of E with respect to $t_x$, and set this to 0, we see that the optimal solution for the absolute time $t_x$ of label Px is:

$$t_x=\frac{1}{N}\sum_{n=1}^{N}\{t_n+\text{preferred}(n)\}$$

6. The corresponding duration of multimedia object n is calculated with:

$$\text{duration}(n)=t_x-t_n$$

Figure 3:
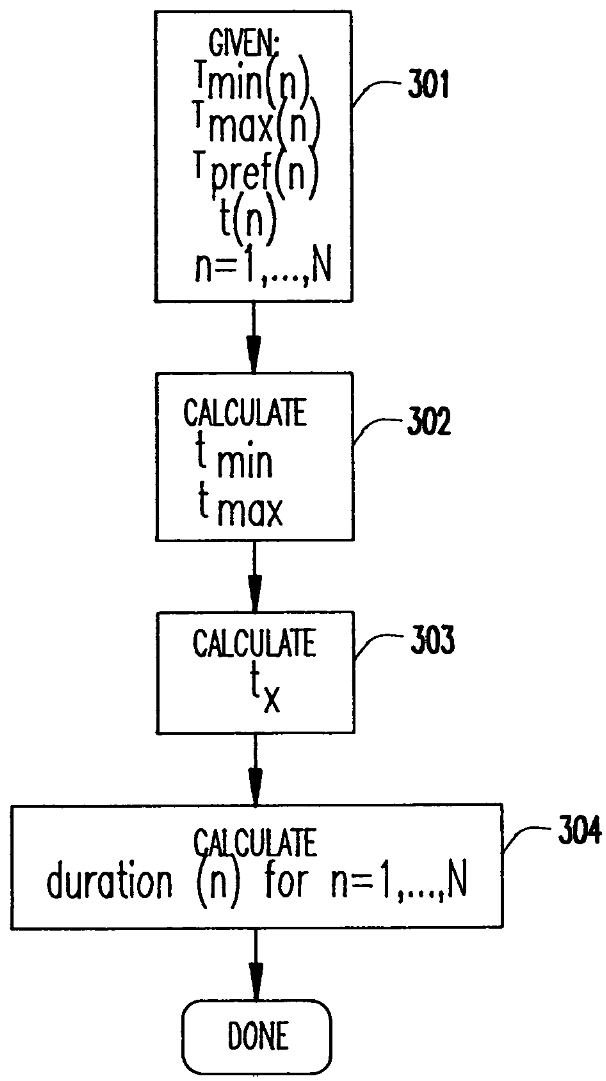
FIG. 3 is a flow diagram showing the logic of the overall process according to the invention.

The entire process of steps 1 through 6 is summarized as illustrated in FIG. 3. The inputs to the process as in step 1, supra, are shown at block 301. Step 2 calculates the minimum and maximum end times over all multimedia objects in function block 302. This is described in more detail in the description of FIG. 4, infra. Next, the steps 3, 4 and 5 are combined in function block 303. This is described in more detail in the description of FIG. 5, infra. Finally, the durations of the objects are calculated in function block 304, which is described in more detail in the description of FIG. 6, infra.

Figure 4:
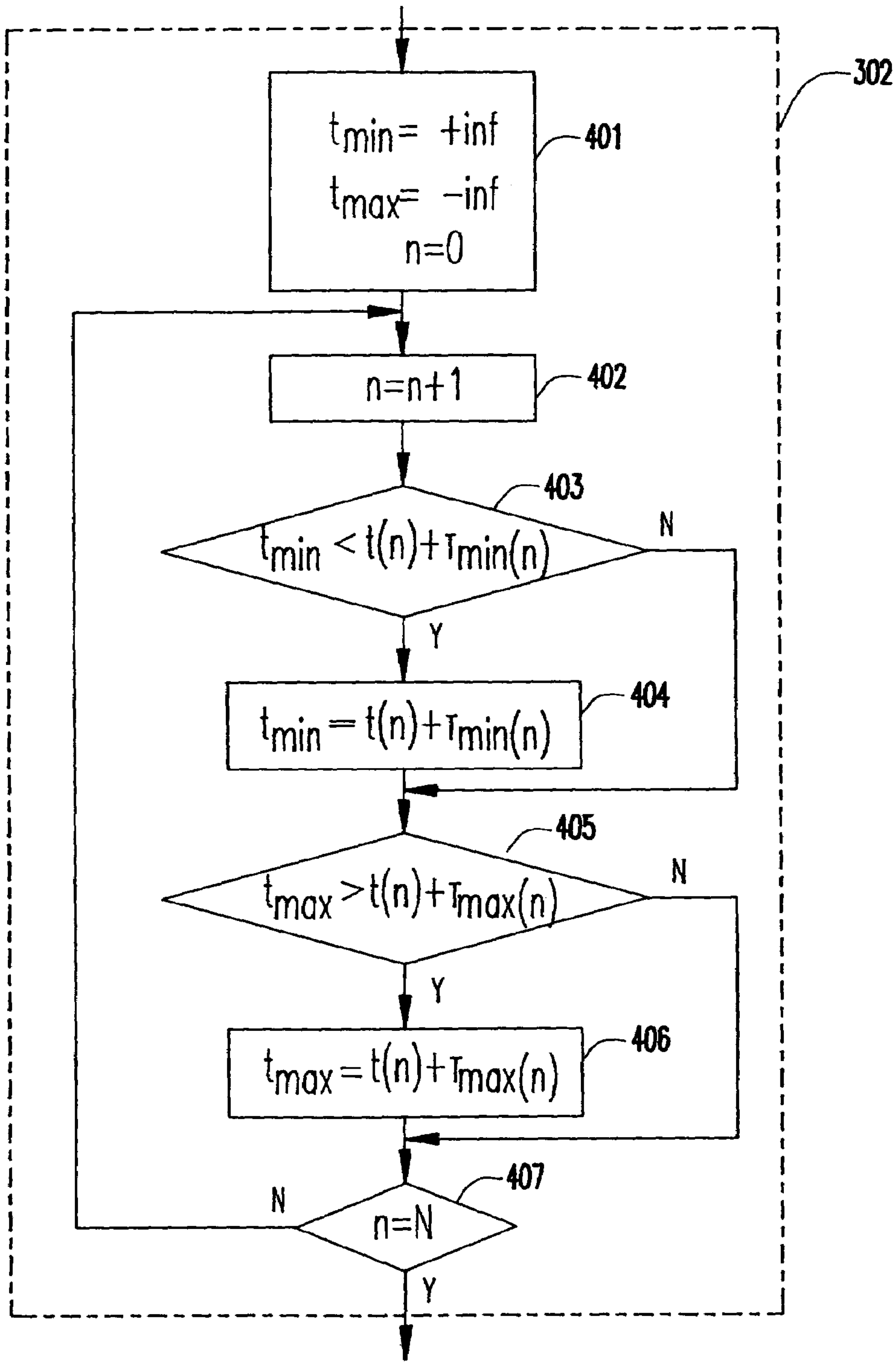
FIG. 4 is a flow diagram showing the logic of the process for calculating the minimum and maximum times in block 302 of FIG. 3.

Step 2 (i.e., block 302 of FIG. 3) is illustrated more detail in FIG. 4. The process is initialized in function block 401 before entering the processing loop. The value of n is incremented by one in function block 402 at the beginning of the processing loop. A test is made in decision block 403 to determine if the minimum end time is less than the start time of object n plus the minimum duration of object n. If so, the minimum time is set to that value in function block 404. If not, a test is made in decision block 405 to determine if the maximum end time is greater than the start time of object n plus its maximum duration. If so, the maximum time is set to that value in function block 406. Finally, a test is made in decision block 407 to determine if all objects have been processed and, if not, the process loops back to function block 402 where the value of n is again incremented, and the maximum and minimum times for the next multimedia object are calculated. This processing continues until the minimum and maximum end times over all N multimedia objects have been calculated.

Figure 5:
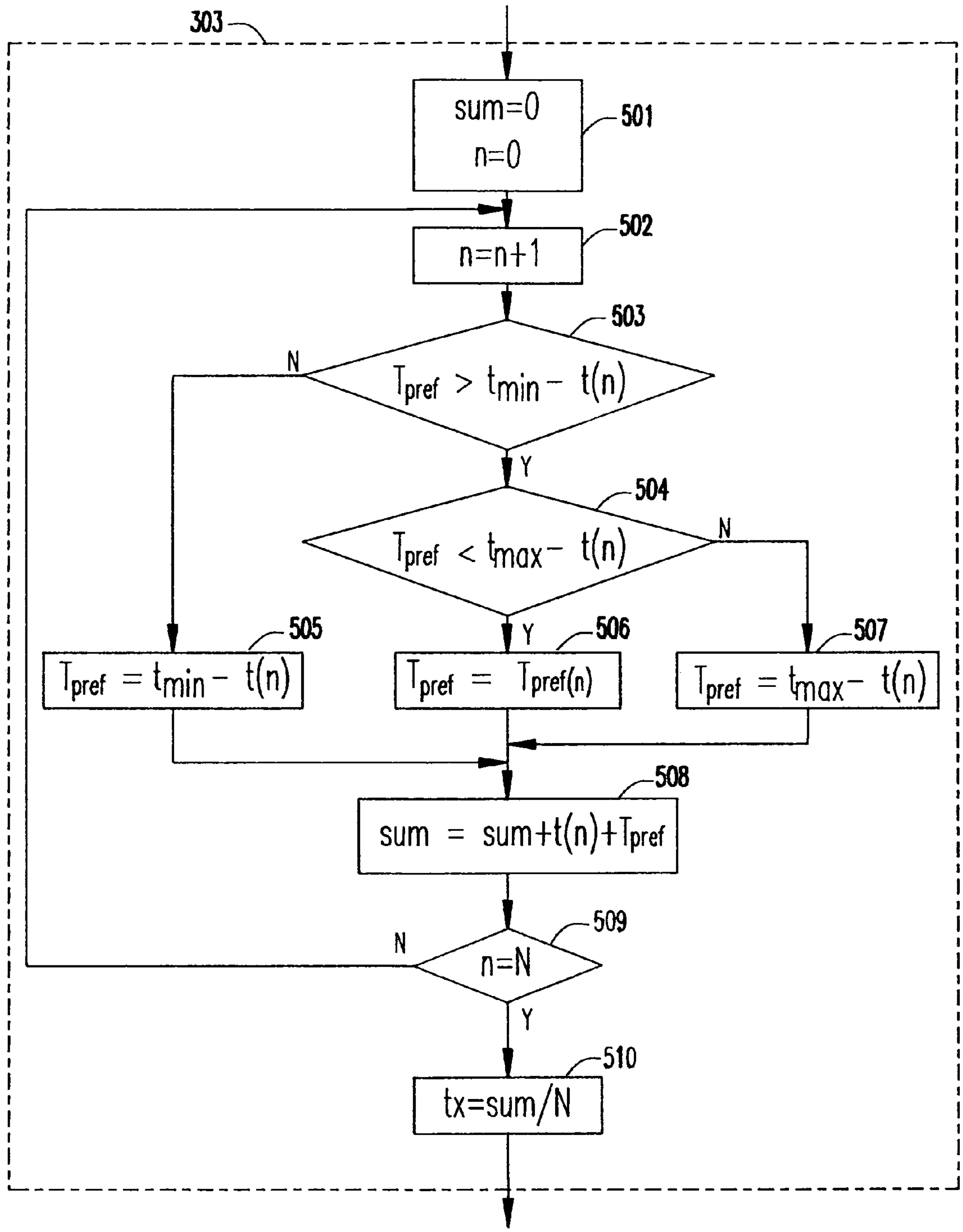
FIG. 5 is a flow diagram showing the logic of the process for calculating $t_x$ in block 303 in FIG. 3.

Steps 3, 4 and 5 (i.e., block 303 in FIG. 3) are illustrated in more detail in FIG. 5. The process is initialized in function block 501 before entering the processing loop. The value of n is incremented by one in function block 502 at the beginning of the processing loop. A test is made in decision block 503 to determine if the preferred duration is greater than the minimum end time less the start time of a current object n. If not, the preferred duration is set to this value in function block 504; otherwise, a further test is made in decision block 505 to determine if the preferred duration is less than the maximum end time less the start time of the current object n. If not, the preferred duration is set to this value in function block 506; otherwise, the preferred duration is set to the preferred duration of the object n in function block 507. Then, in function block 508, the sum of the times is calculated. A test is made in decision block 509 to determine if all objects have been processed and, if not, the process loops back to function block 502 where the value of n is again incremented. When all objects have been processed, the time $t_x$ is computed as the sum divided by N, the number of the multimedia objects, in function block 510.

Figure 6:
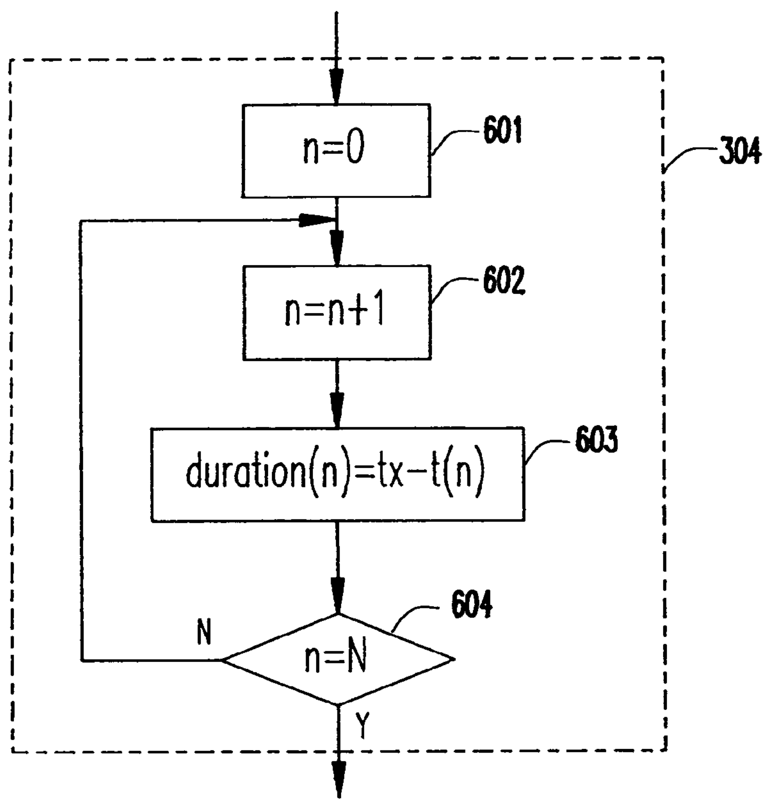
FIG. 6 is a flow diagram showing the logic of the process for calculating the durations of the objects in block 304 of FIG. 3.

Step 6 (i.e., block 304 in FIG. 3) is shown in more detail in FIG. 6. The process begins by initializing n to zero in function block 601. The value of n is incremented by one in function block 602 at the beginning of the processing loop. The duration of each object n is calculated in function block 603 as the calculated time $t_x$ minus the start time t(n) of the object n. After each calculation, a test is made in decision block 604 to determine if all objects have been processed. If not, the process loops back to function block 602 where n is again incremented and the duration of the next object is calculated. The process ends when all N objects have been processed.

While the invention has been described in terms of a single preferred embodiment, those skilled in the art will recognize that the invention can be practiced with modification within the spirit and scope of the appended claims.

What is claimed is:

1. A computer-implemented method of progressive time stamp resolution in a multimedia presentation, comprising the steps of:

supplying a player of a multimedia presentation with information comprising two labels, one for a multimedia object's start time and one for the multimedia object's end time relative to other multimedia object start and stop times, and three durations, a maximum duration and a preferred duration for each multimedia object prior to playback of the multimedia object; and resolving the durations of the multimedia objects using said information based on actual multimedia object durations and arrival of information of multimedia objects to be played, wherein the step of resolving comprises the steps of:

collecting all the dependency relations for a label Px, by taking all objects n that have Px as the label for their end time:

$$t_n+\text{minimum}(n)\leqq t_x\leqq t_n+\text{maximum}(n)\quad n=1, \ldots, N$$

where $t_n$ is the start time of object n, and N is the number of objects;

using the N relations to calculate the tightest bounds on $t_x$ $$\min\{t_x\}\leqq\{t_x\}\leqq\max\{t_x\}$$

with $$\min\{t_x\}=\max\{t_x+\text{minimum}(n)\}\quad n=1, \ldots, N$$

$$\max\{t_x\}=\min\{t_x+\text{maximum}(n)\}\quad n=1, \ldots, N;$$

recalculating bounds on the duration of each object n, by using:

$$\text{duration}(n)=t_x-t_n$$

to get $$\min\{t_x\}-t_n\leqq\text{duration}(n)\leqq\max\{t_x\}-t_n\quad n=1, \ldots N; \text{ and}$$

recalculating the preferred duration of each object n according to the process:

if (preferred($n$)<min{$t_x$}$-t_n$) then preferred($n$)=min{$t_x$}$-t_n$ else if (preferred($n$)>max{$t_x$}$-t_n$)

then preferred($n$)=max{$t_x$}$-t_n$ end if.

2. The method of progressive time stamp resolution in a multimedia presentation recited in claim 1 wherein the step of resolving further comprises the steps of:

using as the general error criterion for resolving the duration of each multimedia object:

$$E=\sum_{n=1}^{N}\{\text{duration}(n)-\text{preferred}(n)\}^2$$

or, substituting $duration(n)=t_x-t_n$:

$$E=\sum_{n=1}^{N}\{t_x-t_n-preferred(n)\}^2$$

and taking the derivative of E with respect to $t_x$, and setting this to 0 to obtain the optimal solution for the absolute time $t_x$ of label Px as:

$$t_x=\frac{1}{N}\sum_{n=1}^{N}\{t_n+preferred(n)\};$$ and calculating the corresponding duration of multimedia object n as:

$$duration(n)=t_x-t_n.$$

* * * * *